Dec. 23, 1958     A. SERAGNOLI     2,865,261
MECHANISM TO PRODUCE A TEAR-STRIP AND
TO SECURE IT TO A WRAPPER
Filed March 24, 1955

INVENTOR
ARIOSTO SERAGNOLI
BY *[signature]*
ATTORNEY

100
United States Patent Office 2,865,261
Patented Dec. 23, 1958

2,865,261

MECHANISM TO PRODUCE A TEAR-STRIP AND TO SECURE IT TO A WRAPPER

Ariosto Seragnoli, Bologna, Italy

Application March 24, 1955, Serial No. 496,585

1 Claim. (Cl. 93—1)

This invention relates to a mechanism to secure a tear-strip to a wrapper.

The style of packing is known in which a tear-strip is secured to the wrapper, being free at one end, which is pulled to open the package, thus tearing the wrapper. Such a style of packing is used, for instance, in the cellophane wrap of packets of cigarettes, biscuits, etc.

In the usual mechanisms, the tear-strip is cut from a tape wound on a reel, having the same width as the tear-strip: the length of tape to be cut is equal to the length of the tear-strip to be produced. Such mechanisms give rise to troubles caused by the difficulty in guiding the narrow tape and, furthermore, they require expensive reels of narrow tape, difficult to provide.

The invention comprises means to cut a narrow strip from the end of a wide band the width of which is equal to the length of the tear-strip to be produced. Thus, the length of material cut from the reel is equal to the width of the tear-strip to be produced if it is cut at right angle, or greater if it is cut obliquely and the width of the band from which the tear-strip is cut is equal or correspondingly lesser than the length of the tear-strip if this is cut at right angle or obliquely.

The objects of the invention are the means to cut and secure the tear-strip to the wrapper, comprising a cutter provided with suction ports to hold the strip while cutting it and to bring and press it against the wrapper and both together against suitable contrasting means with the object of sealing them together.

This invention is described in the specification as a preferred embodiment and illustrated drawings which form an integral part of it, and in which.

Figure 1:
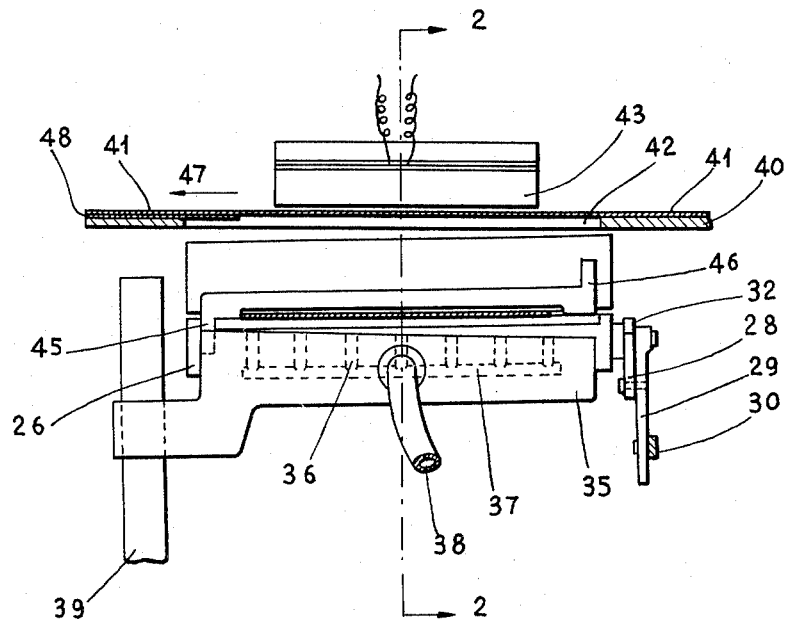
Fig. 1 is a front view of the mechanism.

The preferred manner of embodiment illustrated is particularly suitable for materials, both for the wrapper and the tear-strip, which adhere to each other when compressed together and heated. Said manner of embodiment comprises a device to feed the band 21 from which the tear-strip has to be cut. The band has a width equal to the length of the tear-strip to be produced. The feeding device comprises an idle compression roller 25 and a feeding roller 26, between which passes the band 21. Means are provided to rotate intermittently roller 26, so as to advance band 21, comprising an oscillating lever 29, a driving rod 30 hinged in an adjusting groove 31 of said lever 29, to impress the oscillating motion to the lever. The groove enables the width of the oscillation to be properly adjusted. A catch 28, carried by said lever 29 engages a toothed wheel 32 connected with said roller 26, so as to rotate the roller in the direction of arrow 27 while lever 29 oscillates backwards to the left, but letting the roller rest when lever 29 oscillates forward. A stationary guide 33 and a stationary cutter 34 are provided, between which passes band 21. A mobile cutter 35, sliding on a stationary guide 39 is fixed to the frame of the mechanism, cooperating with the stationary cutter 34 to form a scissors. The mobile cutter carries grooves 36 which together with cover 49, form ducts ending on the upper face of said mobile cutter with suction ports. Ducts 50 and a flexible pipe 38 communicate with said ports through the above mentioned grooves 36 and elements 51, to set the suction ports in communication with a suction device of any usual type, not shown. A stationary guide 40 on which a feeding device of any usual type, not shown in the figures, makes the band 41 of wrapping material to which the tear-strip has to be secured, advance in the direction of arrow 47. Stationary contrasting means 43 heated by electrical resistances 44, are placed above said mobile cutter 35. A groove 42 in the stationary guide 40 allows the mobile cutter 35 to pass therethrough. Means are employed to set in motion rod 30, which impresses the oscillating motion to the band advancing roller 26. Other means are used to lift the mobile cutter 35. Means of any known type are used to apply and discontinue the suction to the suction ports.

In the figures, reference numeral 48 indicates a tear-strip already secured to the band 41 of wrapping material. Numerals 45 and 46 indicate appendixes of the stationary cutter 34, to guide the mobile cutter 35 while cutting. Numeral 37 indicates a groove in the mobile cutter which communicates with all the grooves 36 and ducts 50.

Figure 2:
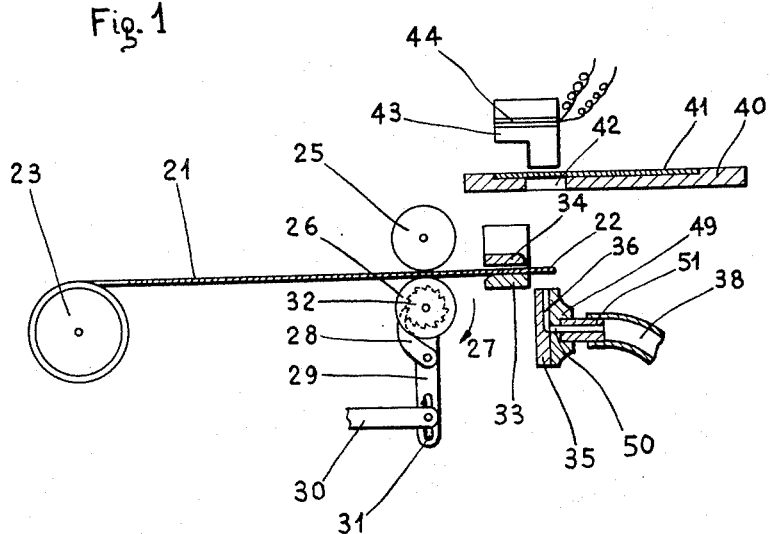
Fig. 2 is a cross section according to line 2—2 in Fig. 1, shown in the direction of the arrows.

The operation is as follows:

At the beginning the mobile cutter 35 is in the lower position shown in Fig. 2. The feeding roller 26 is then rotated and band 21 advances, unwinding from reel 23, between the stationary cutter 34 and guide 33 until it protrudes from cutter 34 of a length equal to the width of the tear-strip to be cut, as is shown in Fig. 2.

At the same time, band 41, to which a tear-strip 48 has previously been secured, advances to the position shown in Fig. 1, so that the part of said band 41 to which a tear-strip has been secured is above the cutter.

Successively, the mobile cutter 35 is lifted, cutting the protruding part 22 of band 21 which forms the tear-strip; at the same time, the ports on the upper part of cutter 35 are subject to a suction, thus holding the tear-strip on the upper face of said cutter.

Thereafter, cutter 35 lifts the tear-strip against band 41 of wrapping material and compresses both together against the heated contrasting means 43, sealing the tear-strip to said band 41.

The suction is then discontinued and the mobile cutter leaves the tear-strip and goes back down to the position shown in Fig. 2. Finally, a further operation is started.

In Fig. 1 is shown a contrasting means 43 shorter than the tear-strip 22, so that the ends of said tear-strip will not be sealed to band 41. Obviously, the contrasting means can be arranged so as to secure the whole of the tear-strip but one end of it to band 41. Fig. 1 shows the cutting edge of cutter 34 which is inclined in respect to the cutting edge of cutter 35 as much as necessary to cut correctly band 21. However, the upper face of cutter 35, the direction of band 41 and the lower face of the contrasting means 43 are parallel, thus joining correctly the tear-strip to band 41. It is obvious that cutter 35 can be guided in various manners: what counts is that the tear-strip is correctly joined to band 41.

In the figures, the thickness of the tear-strip and of band 41 have been magnified for clarity, but actually they are much thinner.

Having thus specified the invention with reference to a preferred manner of embodiment, it will be obvious to those skilled in the art, after having understood the invention, that many changes and alterations can be made without departing from the spirit and scope of the invention itself. It is, for instance, obvious that the band of wrapping material 41 can be fed with many known mechanisms; that the feeding direction of band 41 can be at right angle or parallel to that of band 21; that the wrapping material can be fed in sheets instead of a band; that the tear-strip can be glued to the wrapping material by inserting in the mechanism suitable gluing means; that, accordingly, the contrasting means 43 need not be heated; that the feeding mechanism of band 21 can be of any known type; that the ports on the upper face of cutter 35 can be obtained in whatever manner and number desired; that the release of the tear-strip can be facilitated by blowing air through the ports at the right time, etc. without departing from the invention, and it is intended by the following claim to cover all the changes and alterations which enter into the spirit and scope of the invention as defined by the claim.

I claim:

Mechanism for forming a tear-strip and for securing the same to a wrapper, comprising a stationary guide plate on which a band of wrapping material is disposed for intermittent displacement therealong, said guide plate being provided with an elongated slot for exposing a corresponding area of the lower face of the wrapping material, a stationary guide disposed beneath said guide plate for intermittent movement of a band of tear-strip material therethrough with successive tear-strip sections disposed beneath said elongated slot, said stationary guide comprising a stationary cutter member, means for intermittently feeding said tear-strip band, a vertically movable cutter member normally disposed beneath said stationary cutter member and having a scissors-like cutting action therewith for severing said tear-strip band into tear-strip sections, said movable cutter being disposed in vertical alignment with said slot and being adapted to carry a severed strip into contact with said wrapping material through said slot, said vertically movable cutter member being provided with suction means for retaining the severed tear-strips thereon while being moved into contact with said wrapping material band, and heated means disposed immediately above said slot for effecting sealing of the tear-strips to the wrapper band.

References Cited in the file of this patent

UNITED STATES PATENTS

| | | |
|---|---|---|
| 2,265,609 | Milmoe et al. | Dec. 9, 1941 |
| 2,334,030 | Ranney et al. | Nov. 9, 1943 |
| 2,554,160 | Von Gunten | May 22, 1951 |
| 2,683,401 | Smith | July 13, 1954 |
| 2,758,517 | Brightwell | Aug. 14, 1956 |